United States Patent Office 3,796,774
Patented Mar. 12, 1974

3,796,774
GRAFT COPOLYMER HAVING AN ALKYL VINYL ETHER POLYMER BACKBONE
Nathan D. Field, Allentown, Pa., Donald H. Lorenz, Basking Ridge, N.J., Robert T. Lu, Wilmington, Del., and Herman S. Schultz, Easton, Pa., assignors to GAF Corporation, New York, N.Y.
No Drawing. Continuation of abandoned application Ser. No. 864,882, Oct. 8, 1969. This application Oct. 8, 1971, Ser. No. 187,922
Int. Cl. C08f 29/56
U.S. Cl. 260—881
9 Claims

ABSTRACT OF THE DISCLOSURE

A novel graft copolymer composition comprising methyl methacrylate, alone or together with one or more additional vinyl monomers grafted onto an alkyl vinyl ether polymer or copolymer. Such graft copolymers are produced by free radical polymerization. The graft copolymer is useful as a resin additive, particularly, as an additive for polyvinyl chloride wherein, in a minor amount, the graft copolymer improves the extrusion and similar processing characteristics of the base resin.

---

This is a continuation of application Ser. No. 864,882, filed Oct. 8, 1969, now abandoned.

The present invention relates to the production of a novel graft copolymer; more particularly, the present invention relates to such a novel graft copolymer comprising a graft of methyl methacrylate and possibly one or more additional vinyl monomers onto an alkyl vinyl ether polymer or copolymer.

Various graft polymers or graft copolymers have been developed in the past for particular purposes, the term "graft polymer" or "graft copolymer" denoting a polymer comprising molecules in which the main backbone chain of atoms has attached to it at various points side chains containing different atoms or groups from those in the main chain, the main chain being a copolymer or a homopolymer derived from a single monomer. Generally, such graft copolymers are produced by suspension or solution polymerization techniques wherein a suspension of polymer and monomer is provided, the polymerization initiation providing a graft copolymer by polymerization of the monomer or monomers present on the backbone polymer.

Generally, the graft copolymers which have been heretofore produced, have been produced for their specific properties and characteristics attributed to the graft copolymer and a combination of properties associated with the backbone polymer itself and the polymerized side chains grafted onto the backbone. In accordance with the present invention a novel graft copolymer has been produced which, due to its chemical constitution finds particular utility as a processing aid for resins and a processing aid for polyvinyl chloride and related resins, in particular as more fully disclosed in copending patent application Ser. No. 880,330, now U.S. Pat. 3,658,943.

Thus, in accordance with the present invention it has been discovered that a graft copolymer of methyl methacrylate and optionally one or more additional vinyl monomers on an alkyl vinyl ether polymer or copolymer backbone has the ability when added to polyvinyl chloride and similar resins in a minor amount of increasing the extrusion rate and decreasing the force required to extrude as well as improve other processing characteristics of the base resin. Accordingly, it is a principal object of the present invention to provide such a graft copolymer having such utility as a processing aid.

It is a further object of the present invention to provide a novel graft copolymer comprising a graft of methyl methacrylate and, optionally, one or more additional vinyl monomers on an alkyl vinyl ether polymer or copolymer backbone.

It is yet a further object of the present invention to provide such a graft copolymer having a function as a processing aid for polyvinyl chloride and similar resins wherein the graft copolymer comprises a graft of methyl methacrylate and, optionally, styrene and/or acrylonitrile onto an alkyl vinyl ether polymer or copolymer.

Still further objects of the present invention will become apparent from the following, more detailed description thereof.

As indicated above, it is a principal object of the present invention to provide a novel graft copolymer which is particularly effective as a processing aid for polyvinyl chloride and related resins. Such a graft copolymer in accordance with the present invention comprises a novel composition comprising methyl methacrylate and, optionally, one or more additional vinyl monomers grafted onto an alkyl vinyl ether polymer or copolymer. In accordance with the present invention the optional monomers copolymerized with methyl methacrylate in the production of the novel graft copolymer of the present invention include, for example, styrene and/or acrylonitrile. Such graft copolymers of the present invention can be prepared by conventional free radical polymerization of methyl methacrylate, and any optional additional vinyl monomers, in the presence of the alkyl vinyl ether polymer or copolymer. As described hereinafter, a particularly convenient process for the production of the novel graft copolymer compositions of the present invention comprises the sequential steps of cationically polymerizing a vinyl alkyl ether or mixture of vinyl alkyl ethers with or without additional monomers in a solution of methyl methacrylate followed by free radical polymerization of the methyl methacrylate monomer.

The alkyl vinyl ether polymers or copolymers employed as the backbone in the production of the graft copolymer of the present invention are polymeric materials which can be readily prepared by various polymerization initiator systems including Lewis acids such as $BF_3$, $BF_3$ etherate, stannic chloride and complex metal sulfates. Such polymers can be prepared in various solvents such as benzene, toluene and methylene chloride or can be prepared in bulk or suspension. In preparing such alkyl vinyl ether polymers and copolymers by conventional methods in the presence of solvents it is usual to remove the solvent by evaporation or distillation. In accordance with a preferred procedure in the production of the novel graft copolymers of the present invention, however, the alkyl vinyl ether polymer or copolymer can be prepared by cationic polymerization in the presence of methyl methacrylate, the polymer solution then being ready for free radical polymerization to prepare the graft copolymer through the polymerization of the methyl methacrylate and possibly optional monomers on the alkyl vinyl ether polymer or copolymer backbone.

In accordance with the present invention, the backbone alkyl vinyl ether polymer or copolymer is generally one having a molecular weight such that the polymer is characterized by having a K value within the range of 20–100, preferably within the range of 30–90. The K value is a number calculated from dilute solution viscosity measurements of a polymer and is used to indicate the degree of polymerization or molecular wieght. The formula for calculating the K value is as follows:

$$\frac{\log (N_s/N_o)}{c} = \frac{75K^2}{1+1.5Kc} + K$$

where
$N_s$ = viscosity of the solution
$N_o$ = viscosity of the solvent
$c$ = concentration in grams per ml.

The poly(alkyl vinyl ethers) may consist of polymerized alkyl vinyl ethers of which a lower alkyl ($C_1$–$C_4$) vinyl ether constitutes 0–100 parts and a higher ($C_5$–$C_{32}$) alkyl vinyl ether constitutes 0–100 parts making up a total of 100 parts by weight. The poly(vinyl ethers) can be in the form of random, graft or block copolymers or as mixtures of homopolymers or copolymers.

Thus, suitable lower alkyl vinyl ethers constituting from 0 to 100 parts per 100 parts of the poly(alkyl vinyl ether) polymer or copolymer can suitably be:

methyl vinyl ether      n-butyl vinyl ether
ethyl vinyl ether       isobutyl vinyl ether
n-propyl vinyl ether    t-butyl vinyl ether.
isopropyl vinyl ether Similarly, the higher alkyl vinyl ethers which again can constitute 0 to 100 parts per 100 parts of the poly(alkyl vinyl ether) can comprise:

n-amyl vinyl ether
isoamyl vinyl ether
t-amyl vinyl ether
n-hexyl vinyl ether
n-heptyl vinyl ether
n-octyl vinyl ether
isooctyl vinyl ether
2-ethylhexyl vinyl ether
decyl vinyl ether
dodecyl vinyl ether
tetradecyl vinyl ether
hexadecyl vinyl ether (cetyl vinyl ether)
octadecyl vinyl ether
eicosyl vinyl ether
docosyl vinyl ether
tricosyl vinyl ether
tetracosyl vinyl ether
pentacosyl vinyl ether
triacontyl vinyl ether etc.

Thus, the poly(alkyl vinyl ether) backbone polymer of the graft copolymer of the present invention can advantageously comprise a homopolymer of any of the above lower alkyl or higher alkyl vinyl ethers or copolymers of a lower or mixture of lower alkyls and/or higher or mixture of higher alkyl vinyl ethers in any percentage. Thus, for example, suitable copolymers which can be employed in accordance with the present invention include such as a copolymer of methyl vinyl ether/2-ethylhexyl vinyl ether (53/47 parts by weight) and a copolymer of methyl vinyl ether cetyl vinyl ether (70/30 parts by weight).

As indicated above, the graft copolymers of the present invention are those which consist of methyl methacrylate and optionally one or more additional monomers grafted onto the alkyl vinyl ether polymer or copolymer backbone. When methyl methacrylate is employed as the sole monomeric unit in the production of the graft copolymer of the present invention, the same is generally employed in a weight ratio of 10 to 95% by weight to 5 to 90% by weight of the alkyl vinyl ether polymer or copolymer.

In addition to the methyl methacrylate monomer, however, the graft copolymer of the present invention can be produced by utilizing styrene and/or acrylonitrile in addition to the alkyl vinyl ether and methyl methacrylate. In producing such a graft copolymer using a mixture of monomers, the styrene can be employed such that the same is present in an amount up to 80% by weight based upon the total weight of the graft copolymer. Similarly, the acrylonitrile can be employed such that the same is present in an amount of up to 10 parts by weight based upon the weight of the total graft copolymer. It is pointed out, however, that the use of the styrene and acrylonitrile in the graft copolymer is a non-essential characteristic of the novel copolymers of the present invention, the basic characteristics being attributed to the grafting of methyl methacrylate on the backbone of an alkyl vinyl ether polymer or copolymer.

In accordance with a preferred embodiment of the present invention, the graft copolymer composition includes 10 to 35% by weight of the alkyl vinyl ether polymer or copolymer, and 65 to 90% by weight of the methyl methacrylate units. Again, in accordance with a preferred embodiment of the present invention, the acrylonitrile units can be present in an amount of from 0 to 10% by weight, the styrene being present in an amount of 0 to 25% by weight.

The methyl methacrylate, either alone or together with the other monomers, e.g., styrene and/or acrylonitrile, are generally polymerized in the presence of the alkyl vinyl ether polymer or copolymer using conventional free radical initiators. Any conventional technique of polymerization can be generally employed including, for example, bulk, emulsion, suspension and solution polymerization techniques. Useful free radical polymerization initiators that can be advantageously utilized in the production of the novel graft copolymers of the present invention include peroxides such as benzoyl peroxide, lauroyl peroxide, di-t-butyl peroxide, di-isopropyl peroxycarbonate, t-butyl hydroperoxide, t-butyl peroxypivalate, azo compounds such as azo-bis-isobutyronitrile, and redox systems such as sodium bisulfite/sodium persulfate and dimethyl aniline/benzoyl peroxide. In the production of the novel graft copolymers of the present invention, peroxide initiators are preferred, and a suspension polymerization technique is particularly advantageous. Such a technique comprises one wherein a polymerization process is carried out in which the monomer or mixture of monomers is dispersed by mechanical agitation in a second liquid phase, usually water, in which both the monomer and polymer are essentially insoluble. Of course, in the production of a block copolymer by suspension polymerization, such a system includes in addition to the second liquid phase and monomer the polymeric or copolymeric backbone. The monomer droplets are polymerized while maintained in dispersion by continuous agitation, polymerization initiators and catalysts being used being those which are generally soluble in the monomer. According to the type of monomer, emulsifier, protective colloid and other modifiers that may be used in the suspension polymerization method the resulting polymers or graft copolymers as in accordance with the present invention may take the form of pearls, beads, soft spheres, or irregular granules which are easily separated from the suspending medium when agitation is ceased. Again, such a suspension polymerization technique is one which has been found to be advantageously utilized in the production of the novel graft copolymers of the present invention.

Within the limits previously set forth with respect to the methyl methacrylate and alkyl vinyl ether polymer or copolymer functionality of the graft copolymer of the present invention, including the optional additional use of styrene and/or acrylonitrile, the graft copolymers of the present invention are those in which the same have a molecular weight characterized by a K value within the range of 25 to 110, preferably within the range of 35 to 100. Again, the K value, indicative of the molecular weight of the graft copolymer, is defined as set forth above.

It is pointed out that a still preferred method of producing the novel graft copolymers of the present invention is one wherein cationic polymerization of an alkyl vinyl ether or mixture of alkyl vinyl ethers to produce the backbone polymer or copolymer is carried out in the presence of the methyl methacrylate monomer plus additional optional monomeric materials. In this way, the novel graft copolymer can be produced by the sequential steps of cationic polymerization of the vinyl alkyl ether followed by free radical polymerization of the monomer system. This, therefore, eliminates the necessity of removal of solvents which would be generally required if other than the monomeric solvents were employed in the suspension or similar polymerization technique.

It is again pointed out that the graft copolymers of the present invention find particular utility as additives in other polymers, particularly, polyvinyl chloride, copolymers of vinyl chloride, chlorinated polyvinyl chloride and related resins. Thus, when added to the latter in relatively small amounts, i.e., 0.5 to 10% by weight, preferably, 1 to 5% by weight, the resulting polymer mixtures demonstrate high rates of extrusion, before the appearance of melt fracture, which appearance is highly undesirable. Such high rates of extrusion are accompanied by lower power requirements during extrusion. Moreover, the resulting polymer mixture maintains the good properties of polyvinyl chloride, the combination of properties associated with the mixture enabling high productivity of rigid polyvinyl chloride extrusions and moldings having excellent mechanical properties.

The production of the novel graft copolymers of the present invention will now be described by reference to the following specific examples.

EXAMPLE I

Graft polymerization of styrene, methyl methacrylate and acrylonitrile on poly(methyl vinyl ether)

To a 3-necked, 1-liter flask equipped with stirrer, condenser and nitrogen inlet were charged 55 g. of styrene, 15 g. methyl methacrylate, 5 g. acrylonitrile and 20 g. of poly (methyl vinyl ether). After the polymer had completely dissolved, 350 ml. of water and 0.2 g. poly(methyl vinyl ether/maleic anhydride) (suspending agent) followed by 0.3 g. lauroyl peroxide and 0.3 g. benzoyl peroxide were added. The mixture was heated at 72° for 18 hours and 80° for 1.5 hours. On cooling the white solid was filtered and washed. It had a viscosity number of 0.96.

When a sample of this material was compounded at 5 parts to 95 parts of polyvinyl chloride it was found to improve the extrusion properties of polyvinyl chloride without injuring the physical properties of the final polyvinyl chloride compound.

EXAMPLE II

Methyl methacrylate graft onto a copolymer of methyl vinyl ether/hexadecyl vinyl ether A copolymer of methyl vinyl ether/hexadecyl vinyl ether was prepared as follows:

To a 1-liter resin kettle equipped with stirrer, Dry-Ice condenser, addition funnel and a rubber septum port were charged 33 g. of hexadecyl vinyl ether and 100 g. of toluene and 66.5 g. of methyl vinyl ether. The mixture was cooled to —5° C. and 0.15 ml. of $BF_3 \cdot OEt_2$ in dioxane ($3 \times 10^{-4}$ moles/cc.) was added. Three hours later a second 0.15 ml. increment of catalyst was added. A third increment of 0.15 ml. was added 2½ hours later. The reaction went to 85% conversion and the polymer had a K value of 75. Toluene was removed in a vacuum oven at 40° to constant weight.

Thirty grams of the dry copolymer were dissolved in 70 g. of methyl methacrylate and this was added to a resin kettle equipped with a stirrer and condenser. To this were added 250 ml. of deionized water containing 0.6 g. of vinyl pyrrolidone/vinyl acetate copolymer and 0.02 g. of $Na_2HPO_4$ and 1 g. of benzoyl peroxide. Air was removed by pulling a vacuum and releasing three times with nitrogen. The mixture was heated to 75° and held at that temperature for 7 hours. The white solid slurry in water was filtered and washed with additional water. The dry weight of product was 96.3 g. and had a relative viscosity of 2.03 (0.5% in benzene).

When the graft copolymer was blended with polyvinyl chloride at a 2 parts level, it was found to improve the extrusion properties of the polyvinyl chloride without showing any ill effects on the physical properties.

EXAMPLE III

Copolymerization of methyl vinyl ether and hexadecyl vinyl ether in methyl methacrylate solvent To a clean, dry 5-liter Morton flask equipped with a stainless steel paddle stirrer, Dry-Ice condenser, addition funnel and rubber septum joint were charged 344 g. of hexadecyl vinyl ether and 1150 g. of methyl methcarylate (low inhibitor grade, dried over molecular sieves). Air was removed from the flask by pulling a vacuum and releasing three times with dry nitrogen. While maintaining a positive nitrogen head, the flask was cooled to 0° C. and 800 g. of methyl vinyl ether liquid were added from a pressure cylinder. After stirring for ¼ hour to equilibrate the temperature at 0° C. an increment of 0.86 ml. of boron trifluoride etherate in dioxane ($7 \times 10^{-4}$ moles/cc.) was added. After waiting two hours, while maintaining the temperature at 0° a second increment of 0.86 ml. of catalyst was added. While maintaining the flask in the cooling bath, the inside temperature gradually increased to 4° C. over a 1-hour period, and then decreased over ½ hour period to 0° C. Three hours after the second addition, a third increment of 0.86 ml. was added and the inside temperature increased to 9° C. over a ¼ hour period. The inside temperature gradually decreased to 0° C. after about an hour, it was maintained at this temperature until complete conversion to polymer. A sample had a K value of 46. This polymer solution in methyl methacrylate was readily suspended in water. Polymerization was carried out with lauroyl peroxide to yield graft copolymers which were excellent processing aids for polyvinyl chloride.

EXAMPLE IV

Methyl methacrylate graft onto a copolymer of methyl vinyl ether/2-ethylhexyl vinyl ether To a stainless steel 5 gallon reactor equipped with 4 blade turbine agitator, were charged, 800 g. of 50% solids solution of poly(methyl vinyl ether/2-ethylhexyl vinyl ether) (53/47 wt. percent) in methyl methacrylate, 1200 g. of low inhibitor grade methyl methacrylate, 8000 g. of deionized water, containing 0.48 g. of $Na_2HPO_4$, and 11.8 g. of vinyl pyrrolidone/vinyl acetate copolymer (S–360) and 20.0 g. benzoyl peroxide. Air was purged by pulling a vacuum and releasing three times with nitrogen. Temperature was brought to 75° over 1¾ hours and maintained at 75° for 2 hours, the temperature was then raised to 85° and held at that temperature for 3 hours.

After cooling to room temperature the white slurry was filtered and washed 3 times with water and dried. The total yield of dry product was 1951 g. which had a relative viscosity of 0.5% in benzene of 2.15.

When the graft was compounded with polyvinyl chloride at the 5 parts level it was found that it substantially improved the extrusion properties of the polyvinyl chloride, without any deleterious effect on the physical properties.

EXAMPLE V

Methyl methacrylate graft on poly(methyl vinyl ether)

To a 1-liter resin kettle equipped with stirrer, condenser, nitrogen inlet are charged 20 g. of poly(methyl vinyl ether), 80 g. of methyl methacrylate, and 250 ml. of a solution made with 250 ml. of water, 0.6 g. vinyl pyrrolidone/vinyl acetate copolymer, and 0.022 g. $Na_2HPO_4$. The temperature was raised to 75° and 1 g. of benzoyl peroxide was added. Solid began forming around the walls within 1 hour, but the reaction was maintained at 75° for 7 hours. The slurry was cooled to room temperature and filtered. The while solid was washed three times with 250 ml. of distilled water and finally dried in vacuum oven at 40° overnight. The dry weight of product was 88 g. and it had a relative viscosity of 2.06 (0.5% in benzene). It markedly improved the processibility of polyvinyl chloride when added at the 5% level.

EXAMPLE VI

Methyl methacrylate graft on poly(isobutyl vinyl ether)

Using a procedure identical with that of Example V except that 20 g. of poly(isobutyl vinyl ether) instead of poly(methyl vinyl ether) was used, 99.4 g. of product was obtained having a relative viscosity of 1.68 (0.5% in benzene).

EXAMPLE VII

When Example I is repeated, except that the acrylonitrile is omitted, a substantially equivalent graft copolymer is obtained.

EXAMPLE VIII

When Example I is again repeated, except that the styrene monomer is omitted, a substantially equivalent graft copolymer is obtained.

What is claimed is:

1. A non cross-linked graft copolymer consisting essentially of approximately by weight 10 to 95% of methyl methacrylate monomer, 0 to 80% of styrene monomer and 0 to 10 of acrylonitrile monomer graft polymerized on a backbone consisting essentially of a member selected from the group consisting of homopolymers of $C_{5-32}$ alkyl vinyl ethers and copolymers consisting of $C_{1-4}$ alykyl vinyl ethers and $C_{5-32}$ alkyl vinyl ethers and constituting about 5 to 90% by weight of the graft copolymer.

2. A graft copolymer as defined in claim 1 containing approximately by weight, 65 to 90% of said methyl methacrylate, 0 to 10% of said acrylonitrile, 0 to 25% of said styrene and 10 to 35% of said polymer of alkyl vinyl ethers.

3. The graft copolymer of claim 1 wherein said graft copolymer is characterized by a K value of 25–110.

4. The graft copolymer of claim 1 wherein said polymeric alkyl vinyl ether backbone comprises a homopolymer of a $C_{5-32}$ alkyl vinyl ether.

5. The graft copolymer of claim 4 wherein said polymeric alkyl vinyl ether backbone has a K value of 20–100.

6. A graft copolymer comprising methyl methacrylate grafted onto a polymeric alkyl vinyl ether backbone comprising a copolymer of methyl vinyl ether and hexadecyl vinyl ether, the methyl methacrylate units being present in an amount of 10–95% by weight and the alkyl vinyl ether backbone being present in an amount of 5–90% by weight based on the total weight of the graft copolymer.

7. The graft copolymer of claim 6 wherein said polymeric alkyl vinyl ether backbone comprises a copolymer of methyl vinyl ether and 2-ethylhexyl vinyl ether.

8. The graft copolymer of claim 6 wherein said polymeric alkyl vinyl ether backbone comprises a copolymer of methyl vinyl ether and isooctyl vinyl ether.

9. The graft copolymer of claim 1 wherein said alkyl vinyl ether backbone polymer comprises a copolymer of $C_{1-4}$ alkyl vinyl ethers and $C_{5-32}$ alkyl vinyl ethers.

References Cited

UNITED STATES PATENTS

| | | | |
|---|---|---|---|
| 3,676,190 | 7/1972 | Landler et al. | 117—76 |
| 2,830,032 | 4/1958 | Siebel | 260—885 |
| 3,658,943 | 4/1972 | Field et al. | 260—876 R |
| 3,098,838 | 7/1963 | Goldberg et al. | 260—885 |

FOREIGN PATENTS

| | | | |
|---|---|---|---|
| 1,165,197 | 9/1969 | Great Britain | 260—80.3 E |

MURRAY TILLMAN, Primary Examiner

C. SECCURO, Assistant Examiner

U.S. Cl. X.R.

260—885, 876 R